United States Patent [19]

Satomi et al.

[11] Patent Number: 4,841,401
[45] Date of Patent: Jun. 20, 1989

[54] AMORPHOUS MAGNETIC HEAD

[75] Inventors: Mitsuo Satomi; Akio Kuroe, both of Katano; Eisuke Sawai, Hirakata; Masaru Higashionji, Katano; Hiroshi Sakakima, Hirakata; Kenji Kondo, Osaka, all of Japan

[73] Assignee: Matsushita Electric Industrial Co., Ltd., Osaka, Japan

[21] Appl. No.: 224,215

[22] PCT Filed: Feb. 9, 1984

[86] PCT No.: PCT/JP84/00037

§ 371 Date: Oct. 9, 1984

§ 102(e) Date: Oct. 9, 1984

[87] PCT Pub. No.: WO84/03167

PCT Pub. Date: Aug. 16, 1984

Related U.S. Application Data

[63] Continuation of Ser. No. 31,183, Mar. 30, 1987, abandoned, which is a continuation of Ser. No. 666,089, Oct. 9, 1984, abandoned.

[30] Foreign Application Priority Data

Feb. 10, 1983 [JP] Japan .................................. 58-20623

[51] Int. Cl.$^4$ ............................................ G11B 5/127
[52] U.S. Cl. .................................... 360/125; 360/127
[58] Field of Search ............... 360/125, 126, 127, 119, 360/120, 121, 122, 123; 29/603

[56] References Cited

U.S. PATENT DOCUMENTS

| | | | |
|---|---|---|---|
| 3,750,274 | 8/1973 | Bealle et al. | 360/119 X |
| 4,179,719 | 12/1979 | Imamura et al. | 360/122 X |
| 4,422,117 | 12/1983 | Nomura et al. | 360/127 X |
| 4,488,195 | 12/1984 | Yanagiuchi et al. | 360/126 X |
| 4,535,376 | 8/1985 | Nomura et al. | 360/126 |

FOREIGN PATENT DOCUMENTS

| | | | |
|---|---|---|---|
| 0030625 | 6/1981 | European Pat. Off. | |
| 0061290 | 9/1982 | European Pat. Off. | |
| 52-139410 | 11/1977 | Japan . | |
| 0068601 | 5/1980 | Japan | 360/126 |
| 0068914 | 6/1981 | Japan | 360/122 |
| 57-20910 | 2/1982 | Japan . | |
| 57-66611 | 4/1982 | Japan . | |
| 57-179925 | 11/1982 | Japan . | |
| 0012120 | 1/1983 | Japan . | |
| 0008117 | 1/1984 | Japan | 360/122 |
| 0090217 | 5/1984 | Japan | 29/603 |
| 0096527 | 6/1984 | Japan | 29/603 |
| 0127213 | 7/1984 | Japan | 360/119 |
| 0157825 | 9/1984 | Japan | 29/603 |

Primary Examiner—Robert S. Tupper
Assistant Examiner—Andrew L. Sniezek
Attorney, Agent, or Firm—Wenderoth, Lind & Ponack

[57] ABSTRACT

A magnetic head includes magnetic cores formed by sputter layers of an amorphous magnetic alloy formed on a non-magnetic substrate (1). A non-magnetic ceramic layer is provided on one amorphous magnetic alloy layer, and a non-magnetic substrate is bonded thereon by a bonding glass layer. The one amorphous magnetic alloy sputter layer is isolated from the bonding glass layer by the non-magnetic ceramic layer to prevent the quality of the bonding glass layer from deteriorating thus a stronger bonding force is maintained. The bonding of the amorphous ceramic layer with respect to the one amorphous magnetic alloy layer is strong, thus providing a magnetic head having high reliability.

9 Claims, 1 Drawing Sheet

AMORPHOUS MAGNETIC HEAD

This application is a continuation of now abandoned application Ser. No. 31,183, filed Mar. 30, 1987, a continuation of application Ser. No. 666,089, filed Oct. 9, 1984, both now abandoned.

BACKGROUND OF THE INVENTION

The present invention relates to a magnetic head and, particularly, to a magnetic head using an amorphous magnetic alloy as a magnetic core.

Conventionally, an alloy material such as permalloy, sendust or the like or ferrite has been employed as a core material for use in a magnetic head. Among these materials, ferrite is the best with regard to wear resistance at present, but is inferior to the alloy material with regard to the problem of magnetic saturation of the head core material when used with a high density recording medium of high coercive force available in recent years, because the saturation magnetic-flux density $B_S$ is lower by 30 to 50% as compared with the alloy material. On the other hand, the alloy material is inferior in wear to the ferrite, but is superior in $B_S$.

From the above point of view, an amorphous magnetic alloy, which is superior in both wear resistance and magnetic property, is interesting. Generally, it is difficult to form an amorphous magnetic alloy of sufficient thickness due to limitations of the manufacturing method, and thus a magnetic core is formed by a layer of such material having on both sides thereof non-magnetic substrates, thereby to ensure necessary mechanical strength thereof. Accordingly, the bonding of such substrates is extremely important.

In a ferrite magnetic head, glass bonding is normally used while with the alloy material, bonding is performed with the use of a silver-solder material, and operating temperatures therefore normally are 700° C. or more. However, with an amorphous alloy it is necessary to operate normally at 500° C. or lower, due to consideration of the magnetic characteristics because of the crystallization temperature (hereinafter referred to as Tx) of the material itself. Namely, if the amorphous magnetic alloy is adapted to heat at Tx or higher, the alloy is crystallized and becomes fragile, and simultaneously the magnetic characteristics become deteriorated so that the amorphous magnetic alloy cannot be used as the magnetic material. Accordingly, for the bonding of the head core material or the forming of the magnetic gap, with the use of the amorphous material it is desirable to use a so-called bonding agent such as ordinary epoxy resin or the like or to perform the bonding operation with the use of a soldering material. Although such procedures are safe in that the amorphous material is not crystallized, the resultant low bonding strength is disadvantageous because the operating temperature during these bonding operations is at most 300° C. or lower.

An audio head formed in such manner has no serious problem, because the track width is wide and the magnetic gap length is wide. However, in a video tape recorder, a computer or a data recorder, it is difficult to maintain a precise width of the magnetic gap with such bonding or soldering material, because the track width is extremely small (for example, tens of micrometers) and the magnetic gap length is extremely small (for example, 0.3 micrometer or lower).

Accordingly, to maintain a magnetic gap of high precision, bonding with the use of glass is most reliable. However, when the magnetic head is constructed of the amorphous magnetic alloy, the performance of the bonding operation and the formation of the magnetic gap should be performed at 500° C. or lower for the above-described reasons, and accordingly the glass material of low melting point of 500° C. or less is required. Glass with such a low softening point contains a substantial amount of lead as such as PbO, and when such glass is employed for bonding to form the magnetic gap in a magnetic head, there is a disadvantage that the yield during operation is extremely low. It has been found that oxidizing, reducing reactions are caused between the PbO in the glass and the metal in the amorphous magnetic alloy at the interface between the amorphous magnetic alloy and the bonding glass, thus liberating metallic lead from inside the glass, thus resulting in considerable reduction of the bonding strength.

SUMMARY OF THE INVENTION

To provide a magnetic head of the present invention, a layer of amorphous magnetic alloy formed by sputtering on one non-magnetic substrate is used as a magnetic core, and another non-magnetic substrate is bonded with the use of bonding glass a non-magnetic ceramic layer formed thereon.

Accordingly, the non-magnetic ceramic layer is adapted to work as a separate material to prevent the bonding glass from being deteriorated so that a high bonding strength is maintained. Furthermore, as an amorphous magnetic alloy formed by sputtering is used, the bonding of the non-magnetic ceramic layer with respect to the amorphous magnetic alloy layer is extremely good, thus resulting in a highly reliable magnetic head.

BEST FORM FOR EMBODYING THE INVENTION

Figure 1:
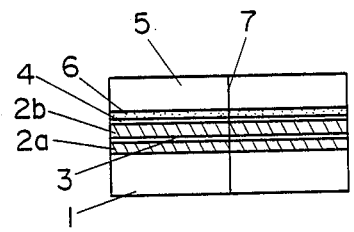
FIG. 1 is a cross-sectional view of one embodiment of a magnetic head in accordance with the present invention.
Figure 2:
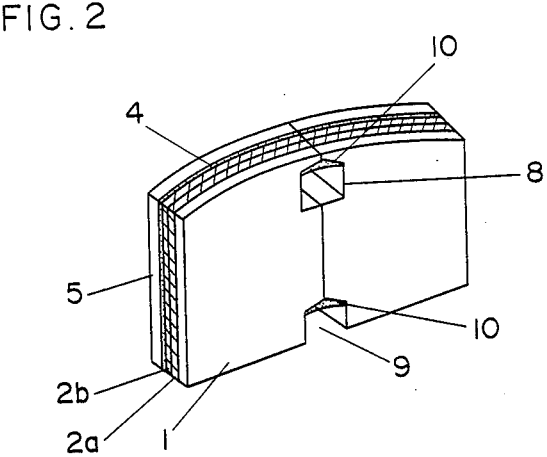
FIG. 2 is a perspective view thereof.

The present invention can be applied in the manner shown in FIG. 1 and FIG. 2 wherein reference numeral 1 is a non-magnetic substrate, on which layers 2a, 2b of an amorphous magnetic alloy are formed by sputtering and a layer of insulation 3 composed of such as $SiO_2$ is provided between layers 2a, 2b. A non-magnetic ceramic layer 4 is provided on the amorphous magnetic alloy layer 2b. A non-magnetic substrate 5 is bonded on the non-magnetic ceramic layer 4 by a bonding glass layer 6. A pair of cores of such construction as described hereinabove are bonded together to form a magnetic gap 7. Reference numeral 8 indicates a coil winding groove, and reference numeral 9 indicates a glass receiver groove. A bonding operation with bonding glass 10 is performed in both grooves.

Each of the components will be described hereinafter in further detail.

Glass with a high melting point (600° C. through 700° C. softening temperature) and which is available on the market is polished to form a mirror face and is washed to form substrate 1. After the interior of a vacuum cell is exhausted to $3 \times 10^{-7}$ Torr, Ar gas is introduced and $2 \times 10^{-2}$ Torr, and then sputtering for about three hours is performed to form on the substrate 1 layer 2a of $Co_{81}Nb_{13}Zr_6$ in composition. The thickness of the formed amorphous magnetic alloy layer 2a is approximately 10 micrometers according to measurement by a stage difference meter. Also, the Tx of the formed amorphous magnetic alloy layer 2a is 540° C. according to measurement by a differential thermal analyzer. Then sputtering is performed for about thirty minutes at a gas pressure of $4 \times 10^{-2}$ Torr in Ar to form on the amorphous magnetic alloy layer 2a insulation layer 3 of $SiO_2$. The thickness of the formed $SiO_2$ layer is approximately 1000 Å. Then, sputtering is performed for about three hours under the same conditions as described hereinabove with $Co_{81}Nb_{13}Zr_6$, thus producing amorphous magnetic alloy layer 2b.

Furthermore, sputtering is performed for thirty minutes to one hundred fifty minutes under the same conditions as for the formation of insulation layer 3 on amorphous magnetic alloy layer 2b, so that a $SiO_2$ layer of 1000 Å through 5000 Å in thickness is formed as non-magnetic ceramic layer 4. Glass (PbO: 84, $B_2O_3$: 11, $SiO_2$: 3, $Al_2O_3$: 2, each weight %, approximately 350° C. in softening temperature) powder of the lead series, with a low-melting point and available on the market is applied to the surfaces thereof and is raised in temperature to 450° C. in an argon atmosphere. Thereafter it is retained for thirty minutes and is cooled to room temperature. According to X ray analysis of the film surface, metal lead is detected from the glass on the film when the non-magnetic ceramic layer 4 has a thickness of 1000 Å to 2000 Å. As the metal lead is not detected when the layer has a thickness of 3000 Å or more, the non-magnetic ceramic layer 4 should have a thickness of 3000 Å or more. A block having a two-layer amorphous alloy layer is provided on the substrate 1. Glass with a low melting point as described hereinabove is applied to a thickness about 2 micrometers on substrate 5 of the same material as that of the substrate 1. Thereafter it is burnt at 480° C. in air for thirty minutes to form glass layer 6 for bonding. In addition, a block of substrates 1 and 5 is heated at 450° C. in an Ar atmosphere with the glass layer 6 and the non-magnetic ceramic layer 4 being abutted, so that a built-up core is provided.

Then, coil winding groove 8 and glass receiving groove 9 are machined on the faces forming gap 7. Thereafter, the butt face is machined to a mirror face with diamond paste. $SiO_2$, which is a gap spacer material, is formed on the butt faces to a thickness half as thick as the desired magnetic gap by sputtering, with the coil winding groove 8 and the glass receiving groove 9 being masked. A non-magnetic ceramic layer (not shown) is formed to a thickness of approximately 3000 Å, by sputtering, on the surfaces of the coil-winding groove 8 and the glass receiving groove 9 with the faces being masked. After sputtering, the mask is removed to complete one side for forming the magnetic gap.

A pair of built-up cores of such construction as described hereinabove are butted against each other. A glass rod having a low melting point and available on the market is inserted into the two grooves to form the magnetic gap. The head yield through observation of break-away or slackness, which is caused in the portion of the bonding glass 6 during the machining operation in a process to be completed into a head in such a manner as described hereinabove, is shown in the table below which also shows the yield of a magnetic head of conventional construction for reference use. The table shows results in a case where the non-magnetic ceramic layer has a thickness of 3000 Å.

| Non-magnetic ceramic layer between amorphous magnetic alloy sputter layer and bonding glass | Yield (%) |
| --- | --- |
| none (conventional) | 20 |
| $SiO_2$ | 80 |
| $Al_2O_3$ | 85 |
| titanium-barium oxide | 97 |
| forsterite | 98 |
| $ZrO_2$ | 85 |
| $TiO_2$ | 90 |
| WC | 83 |
| TiC | 81 |
| SiC | 85 |
| titanium-calcium oxide | 95 |

A non-magnetic ceramic layer is interposed between the amorphous magnetic alloy sputter layer and the bonding glass as described hereinabove so that the head yield by the machining operation can be remarkably improved as compared with conventional products. Also, these materials can be used even if two or more types rather than a single type are combined. The thickness of the non-magnetic ceramic layer is desired to be larger in the isolation between the amorphous alloy and the bonding glass, but to be too thick results in a lowered yield, considering the difference in thermal expansion among the respective materials. Considering practical use, thicknesses of 3000 Å through 5000 Å are desirable. An oxide series is desirable as the material of the non-magnetic ceramic layer, because it has better familiarity with the bonding glass.

In the above-described example, a two layer amorphous alloy construction has been described. It is better to optionally select the thickness, the number of built-up amorphous magnetic alloy sputter layers by track width, and the frequency band. Needless to say, one layer of an amorphous alloy, rather than a laminated structure thereof, may be employed.

To form the layer of the amorphous magnetic alloy, a rapidly quenched ribbon can be used, in addition to sputtering as in the above described embodiment. Sputtering is preferred, because the adhering strength of the non-magnetic ceramic layer to be formed thereon is high. In addition, in the case of the amorphous alloy layer formed by sputtering, the metal-metal system can be used, thus resulting in superior wear resistance and corrosion resistance.

The composition preferable as glass for constructing the bonding glass layer contains 50 through 90% PbO by weight %, at least $SiO_2$, $AlO_2O_3$ and $BaO_3$ the remainder. PbO of 50 weight % or less has an unfavorable influence in that the melting point is high enough to cause the amorphous alloy to be crystallized during the bonding operation. When the amount of PbO is 90 weight % or moe, devitrification is undesirably caused.

The magnetic head of the present invention has utility as the head for a VTR, computer terminal, data recorder using a high density recording medium, because the bonding strength between the non-magnetic substrate and the amorphous magnetic alloy layer is strong, thus realizing magnetic heads reliable particularly in a narrow track.

What is claimed is:

1. In a magnetic head having a magnetic core comprising a first substrate of non-magnetic material, at least one layer of an amorphous magnetic alloy material directly formed on said first substrate, and a second substrate of non-magnetic material bonded to said layer of amorphous magnetic alloy material by a bonding glass layer formed of a glass material containing lead and having a low melting point, the improvement of means for preventing deterioration of said bonding glass layer and resultant weakening of adhesion of the bond between said second substrate of non-magnetic material and said layer of amorphous magnetic alloy material, said means comprising:

a layer of non-magnetic ceramic material, separate from said bonding glass layer, between said layer of amorphous magnetic alloy material and said bonding glass layer, said non-magnetic ceramic layer having a thickness $\delta$ defined by 2000 Å $< \delta \leq$ 5000 Å.

2. The improvement claimed in claim 1, wherein said non-magnetic ceramic layer is composed of at least one material selected from a group composed of $SiO_2$, $Al_2O_3$, $TiO_2$, $ZrO_2$, titanium-barium oxide, forsterite, WC, TiC, SiC and titanium-calcium oxide.

3. The improvement claimed in claim 1, wherein said non-magnetic ceramic layer is composed of ceramic oxide.

4. The improvement claimed in claim 1, wherein the softening temperature of said lead-containing, low-melting point bonding glass layer is 500° C. or lower.

5. The improvement claimed in claim 1, wherein said lead-containing, low-melting point bonding glass layer has a composition of 50 to 90 weight % of PbO and the remainder at least $SiO_2$, $Al_2O_3$ and $B_2O_3$.

6. The improvement claimed in claim 1, wherein said non-magnetic ceramic layer is formed by a sputtering operation.

7. The improvement claimed in claim 1, wherein said layer of amorphous magnetic alloy material comprises a laminated structure formed of plural layers.

8. The improvement claimed in claim 7, wherein said amorphous magnetic alloy material comprises a Co-Nb series alloy.

9. The improvement claimed in claim 8, wherein said Co-Nb series alloy is a Co-Nb-Zr series alloy.

* * * * *